United States Patent [19]
Engle

[11] Patent Number: 6,079,795
[45] Date of Patent: Jun. 27, 2000

[54] LOAD PROPORTIONAL BRAKE CYLINDER PRESSURE LIMITING SYSTEM

[75] Inventor: Thomas Engle, County of Jefferson, N.Y.

[73] Assignee: Westinghouse Air Brake Technologies Corporation, Wilmerding, Pa.

[21] Appl. No.: 09/093,252

[22] Filed: Jun. 8, 1998

[51] Int. Cl.[7] .................................................. B60T 8/18
[52] U.S. Cl. ........................ 303/22.2; 188/195; 303/22.7
[58] Field of Search .................. 303/22.2, 22.3, 303/22.7, 22.8, 22.1, 28, 29, 30; 188/195

[56] References Cited

U.S. PATENT DOCUMENTS

| | | |
|---|---|---|
| 3,573,884 | 4/1971 | Pollinger . |
| 4,289,358 | 9/1981 | Dufft et al. .......................... 303/22.1 |
| 4,453,779 | 6/1984 | Bridigum . |
| 4,844,554 | 7/1989 | Rojecki . |
| 5,005,915 | 4/1991 | Hart et al. . |
| 5,100,207 | 3/1992 | McKay . |
| 5,106,168 | 4/1992 | McKay . |
| 5,125,722 | 6/1992 | Tamammori . |
| 5,211,450 | 5/1993 | Gayfer et al. . |
| 5,269,594 | 12/1993 | Barefoot . |
| 5,269,595 | 12/1993 | McKay et al. . |
| 5,340,203 | 8/1994 | Gowda . |
| 5,346,291 | 9/1994 | Marsh et al. . |
| 5,586,813 | 12/1996 | McKay et al. . |
| 5,669,674 | 9/1997 | McKay et al. . |

*Primary Examiner*—Douglas C. Butler
*Attorney, Agent, or Firm*—Buchanan Ingersoll, P.C.

[57] ABSTRACT

A continuously variable load responsive brake pressure control valve controls the amount of brake pipe pressure for a railway vehicle. The system also includes an isolator for isolating the load sensor from transient inputs caused by normal vehicle motion. A spring loaded isolator coupled with a matched hydraulic cylinder isolate wheel truck deflections with respect to the car body, preventing erroneous inputs to the load sensor of the variable load braking system so as to provide more accurate brake cylinder pressure according to vehicle load weight. The variable load limiting valve is continuously operable between an empty vehicle condition and a fully loaded vehicle condition and assures a minimum braking pressure, while also helping prevent sticking of the brakes.

22 Claims, 7 Drawing Sheets

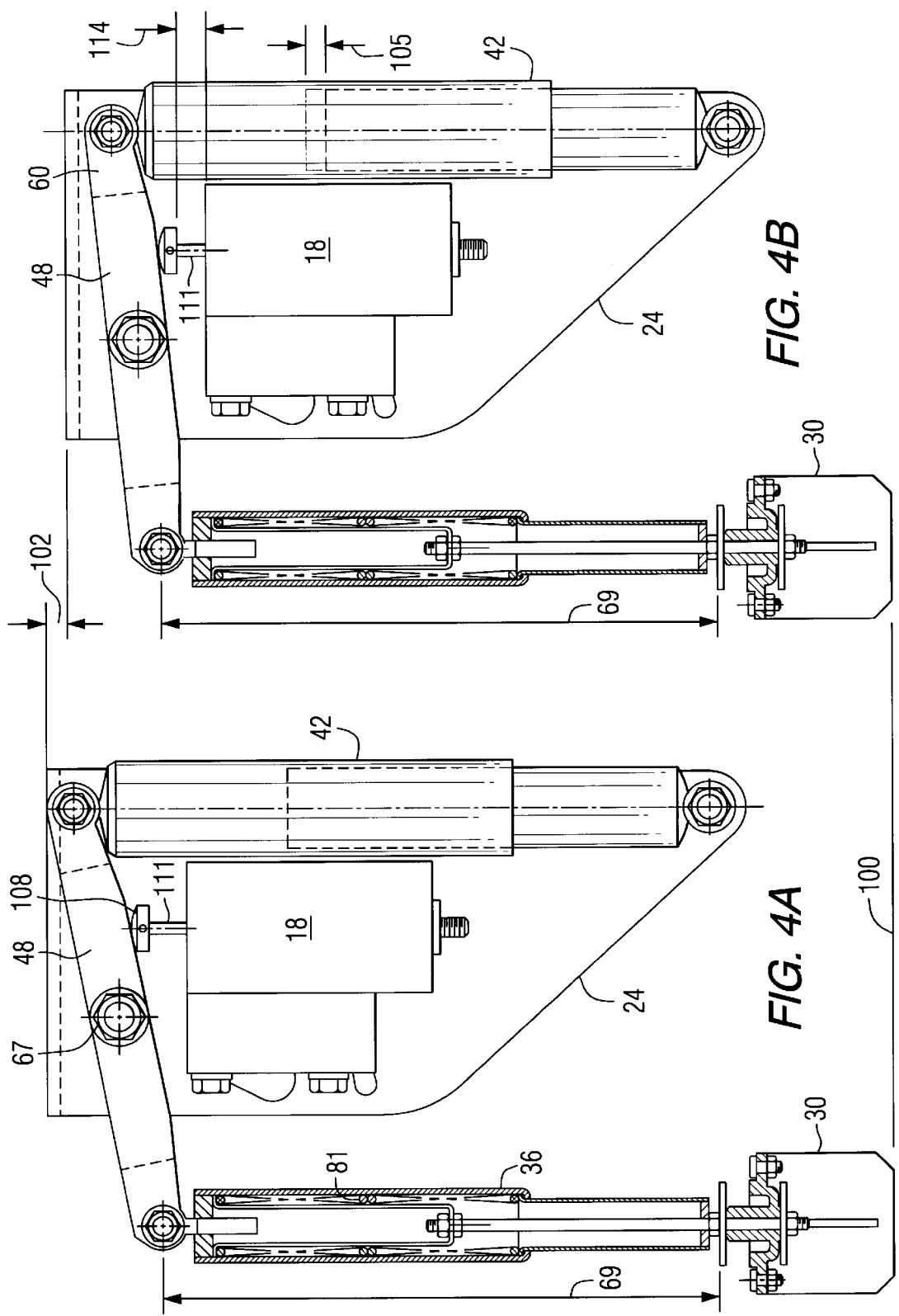

LOAD PROPORTIONAL BRAKE CYLINDER PRESSURE LIMITING SYSTEM

BACKGROUND OF THE INVENTION

1. Field of the Invention

The present invention relates to a variable load type brake control system for a railway vehicle, and more particularly to a load responsive brake pressure control valve which prevents erroneous load sensor readings caused by normal railway freight car motions.

2. Description of the Prior Art

For at least the last 100 years, pneumatic braking has been utilized onboard railway freight cars in which a brake pipe runs the length of the freight train providing a source of pressurized air to each individual car of the train. Braking conditions of the train are controlled by changes in the brake pipe pressure through utilization of pneumatic valves. Traditionally, on board each freight car is a control valve which responds to the brake pipe condition in a multi-function role including: charging reservoirs onboard each individual freight car; instituting brake application; and controlling the release of the brakes on the train. Such systems generally utilized onboard pneumatic control valves such as ABD, ABDW, ABDX, or DB60 valves, with 26 type locomotive brake equipment or microprocessor with like EPIC sold by Westinghouse Air Brake Company. It was the general practice to use identical functioning pneumatic control valves in a related control sequencing on comparably equipped freight cars throughout the train, such that each car's braking sequencing would be similar. Generally, the pneumatic signal is initiated by the lead locomotives in the train. However, some systems have been prepared and used where brake pipe pressures can be controlled at the rear or at spaced intermediate positions within the train.

Freight cars have varying braking capabilities depending on (1) brake cylinder pressure in effect at the moment under consideration; (2) the brake cylinder size; (3) the design of the mechanical linkage (brake rigging) between the brake cylinder and the friction pair (usually a brake shoe and the tread of a steel wheel, with disc brake equipment acceptable but seldom employed); (4) the weight of the car plus its contents; (5) the speed of the car at the time brakes are applied; and (6) the friction force developed as a result of the normal (brake shoe) force by the particular friction pair. The preponderance of the North American freight car fleet uses composition brake shoes on wheel treads thus rendering factor (6) constant, while minimizing the effects of speed (5). Brake cylinder size (2) and mechanical linkage (3) are both constants, chosen at the time of car design and are thus of no importance as variables during train operation. The only variables of importance then during train operation are the brake cylinder pressure (1) and the weight of the car and its contents (4).

Brake cylinder pressure (1) is under the control of the driver as a result of his or her manipulation of brake pipe pressure (through an engineer's brake valve or an electronic control, for example). The weight of the car plus its lading are only determined when the actual load is placed in the car. For some cars (such as those that carry only coal or wheat) this variable has one or the other of two values. For other cars (which carry indeterminate amounts of cargo having indeterminate weight, such as general commodity box cars or intermodal flatcars) the weight of the car and its contents may take on a wide range of values.

In either case, the braking ability of the car will be reduced as its weight is increased. In the past, this has been dealt with by selecting the brake cylinder size and rigging at the time of car design such that the highest braking produced by the maximum brake cylinder pressure available to the driver would not slide the wheels of the light car, while the heaviest possible car with this same maximum brake cylinder pressure, would still provide an effective amount of braking. Standards set by the Association of American Railroads (AAR) permit a maximum braking ratio (the ratio of brake shoe force to actual weight of the car and contents) of about 35%, while a minimum of ±10% is permitted. Thus the contents of a car can weight no more than 2.5 times the weight of the empty car if the rule is to be followed.

In the past, freight trains usually had about as many empty cars as loaded ones, and the average braking ratio for the train as a whole was better than the minimum acceptable for an individual car as cited above. In recent times, however, two developments have made the use of a single value for maximum brake shoe force less acceptable than in former times. These are: (1) greater use of so called unit trains in which every car is carrying the same commodity and all cars in a train are fully loaded (the train average braking ratio in this case is no better than that of the individual cars); and (2) the fact that with today's engineering advances cars can be designed whose weight for the same carrying capacity is lower than older designs. The first condition leads to train braking performance being lower than might be desirable, and the second would lead to a condition where the lading weight was restricted to a value (2.5 times the car weight) significantly lower than equipment design would otherwise permit.

Empty cars cannot utilize the same level of braking as loaded cars because the highly loaded cars are more likely to have their wheels lock and skid at a braking level that would be acceptable on a fully loaded car. Special brake equipment is therefore necessary to increase the loaded car braking ratio without incurring the consequence of a wheel slide condition when braking an empty car. Such equipment automatically adjusts brake shoe force according to the load condition of the car. These special equipment arrangements fall into two categories: dual capacity empty/load braking and multi-capacity or continuously variable braking.

It is well known to those skilled in the art that overbraking and ensuing wheel lockup and wheel sliding on lightly loaded rapid and/or mass transit vehicles must be avoided since flat spots and damage to the wheels may occur during the braking of passenger trains. On heavily loaded railway vehicles there is the possibility that underbraking conditions may result in longer braking distances which may cause a railway train to over-run its normal stopping point at a station or a block section. In order to avoid an overbraking and underbraking condition, it is common practice to employ equipment which senses the load of the car and reduces the brake cylinder pressure on cars that are not fully loaded. Examples of these are disclosed in U.S. Pat. Nos. 5,106,168; 5,100,207; 5,005,915; 5,269,595; and 5,340,203.

In order to overcome these undesirable limitations, brake manufacturers have developed a number of devices for application to the cars which, in response to an engineer's command for maximum brake effort, provide higher brake shoe force on a loaded car than for an empty one, thus permitting light weight cars to carry greater loads, and improving the braking on unit trains of fully loaded cars.

These devices, generically referred to as empty-load brake controls, provide satisfactory service in the case of cars which are either empty or loaded, but they do not provide a complete solution to the problem. One example is a very light car (such as an intermodal spine car), in which case the car will frequently carry a load intermediate between its maximum design capacity and its empty weight. The problem here is that as car weight is increased by loading, the empty-load device produces no increase in maximum brake cylinder pressure until a certain point is reached, and above this point allows the maximum value (loaded car) brake cylinder pressure. Thus if this changeover point is at a high car weight, the brake cylinder pressure will remain at the low value chosen for the empty car and performance of the train will suffer, as the car with its lading could support a higher brake shoe force without danger of sliding wheels. If, on the other hand, the changeover point occurs at too low a total car weight, the maximum brake cylinder pressure for a full load could be made available to a car weighing only slightly more than an empty one, thus heightening the likelihood of sliding wheels.

In the ideal case, the maximum value of brake cylinder pressure permitted would be continuously variable with increased lading weight. This would eliminate both of the undesirable conditions mentioned above.

Of equal importance is the fact that where equipment is to be operated on trains segregated from the general interchange, such as integral trains, a continuous load limiting system can allow the use of much higher loaded braking ratios and hence provide much better control than can be achieved with the AAR standard values. For example, the loaded braking ratio could be made equal to that presently allowed for empty cars, i.e. ±30%. A solid train of such cars, when compared to a solid train of cars braked at 10% (a not unusual condition), would have three times the braking ability, and could safely descend a hill three times as steep or stop in one third of the distance required by the lower braked train. Alternatively, with a train of such cars, the speed could be increased by a factor of 1.732 (or the square root of 3) times the speed of the slower braked train (roughly a 73% of increase) while maintaining the ability to stop in the same distance. This performance improvement is available without demanding any more adhesion of the wheel and rail interface than present practice imposes every day.

In the variable load type equipment, braking pressure is proportioned to the actual load, generally throughout the full range of car loading. It will be appreciated, however, that the proportioned brake pressure is selected in accordance with the maximum brake pressure (emergency) capable of being developed from the maximum running pressure normally carried by a train (110 psi). Therefore, when making relatively light surface braking applications or when making a maximum brake application from a relatively low running pressure (70 psi), the proportioned brake pressure may be far less than that capable of being supported by the adhesion demand. Accordingly, less than optimum brake efficiency is realized under certain brake conditions with variable load type brake equipment, as well as single capacity brake equipment, in order to protect against wheel sliding on an empty car under maximum braking conditions.

In the variable load type equipment, it is common to mount a spring loaded proportioning valve between the railway vehicle car body and the wheel truck assembly. The load on the railway freight car is determined by the amount of deflection between the sprung car body and the unsprung wheel bearings and associated parts of its truck. Thus, for example, the maximum spacing between the bottom of the railway vehicle and the top of a freight type three piece wheel truck assembly is indicative of an empty vehicle, while a fully loaded vehicle is characterized by minimal spacing between the railway vehicle and these same parts. However, this separation distance does not remain constant for either empty or loaded railway vehicles. It is not uncommon for the vehicle and/or wheel assembly to undergo deflections, or rock and roll, as the wheels of the truck assembly traverse the rails during motion. Slight imperfections in the height of the rails, such as at the junction of rail segment ends or in rail high or low spots, can result in raising or lowering of the wheel truck with respect to the railway vehicle body. Additionally, during a curved section of track it is not uncommon for one side of the vehicle to be closer to the truck assembly than the other side, which typically occurs on the inside portion of a curved track section. These deflections can affect inputs to the load sensing valve assembly such that the variable load brake system may thereby be "sensing" a heavier or lighter vehicle than is actually the case.

What is needed then is a system to increase railway vehicle braking efficiency while minimizing errors occurring in load sensing braking systems caused by normal vehicle motion.

It is therefore an object of the present invention to provide a variable load railway braking system which allows the maximum value of braking cylinder pressure to be continuously variable with increased vehicle loading weight.

It is also an object of the present invention to provide a means for isolating the variable load sensing braking system from errors caused by normal railway vehicle deflections during typical train movement.

It is another object of the present invention to provide a variable load limiting valve continuously operable between a railway vehicle empty and fully loaded conditions.

It is a further object of the present invention to provide an easily adjustable maximum pressure output for use on different types of cars.

It is a still further object of the present invention to provide an easily adjustable ratio control of car height to maximum brake cylinder pressure.

SUMMARY OF THE INVENTION

The above and other objects are attained by the present invention, according to which, briefly stated, a variable load limiting valve comprises a load sensing valve in combination with an isolator mechanism. The load sensing valve includes means for continuously varying the pressure of fluid supplied to a fluid operable braking apparatus on a railway vehicle in accordance with the load on the vehicle, the valve including means for sensing a load force bearing on the railway vehicle. An isolating means isolates the load force sensing means from transient deflections of wheel/truck assembly with respect to the railway vehicle not caused by the load on the vehicle but by normal deflections occurring as the vehicle moves over the railway.

In a load proportioning system comprising and isolator and load limiting valve, the isolator dampens transient wheel/truck assembly deflections to prevent the load sensing stem of the load limiting valve from thereby also deflecting. Once the car is loaded, car body deflections with respect to the wheel/truck assembly will reach a "static" point, the isolator assuming its normal position at the loaded car deflection point whereby the isolator mechanism isolates the input lever of the load sensing valve from dynamic effects as the car traverses the line of road in a train. Therefore, load change affects only the variable load limiting valve, while dynamic effects caused by normal track deflections only affect the isolator means.

A variable load limiting valve for use in a vehicle brake control system is also provided. The valve is disposed between a vehicle control valve and brake cylinder device, and adjusts maximum allowable brake cylinder pressure during a brake application according to the vehicle load. The variable load limiting valve comprises a valve body having an inlet port connected to the control valve device and an outlet port connected to the brake cylinder device. A sensing piston is slidably disposed within the valve body and defines a pressure chamber between the sensing piston and the valve body adjacent the outlet port, and provides a fluid communication path between the inlet port and the outlet port. Load sensing means is operably connected to the sensing piston to provide an indication according to the vehicle load, the load sensing means being operable between an empty position and a fully loaded position. The load sensing means comprises a knob operably associated with the isolator mechanism and an input stem which projects into the valve body. A limiting check valve is arranged in such a way that it will prevent flow to the brake cylinder upon reaching maximum brake pressure, and permit flow from the brake cylinder to the control valve (and hence atmosphere) during brake release. One end of the input stem contacts the check valve and holds it off its seat, which is connected to the sensing piston and movable therewith. With respect to the input stem, the limiting check valve is attached to the lower portion of the sensing piston by a spring. The sensing piston and its associated valve seat are movable between an "empty" position wherein a sensing spring, located between the bottom of the sensing piston and the valve body opposite the pressure chamber, is minimally loaded by pressure being fed to the brake cylinder, and a "full load" position in which this spring load is greater.

In operation, the air from the control valve enters the load limit valve and passes through the limiting check valve and enters an upper chamber above the sensing piston, the upper or pressure chamber being in constant communication with the brake cylinder. Pressure in this upper chamber acts to move the sensing piston in a direction which will both increase the compression on the sensing spring and move the valve seat away from the top of the valve body and the knob of the sensing means, thus sliding downward on the input stem. When the seat moves far enough to separate the limiting check valve from the bottom of the input stem, it will necessarily be closed on its seat preventing further pressure increase in the upper chamber and brake cylinder, hence limiting brake cylinder pressure to a value dependent only on static car height.

Further pressure increase from the control valve will have no effect on brake cylinder pressure. If, however, brake cylinder pressure would decrease as a result of leakage, the sensing piston would slide upward on the input stem and move back toward the knob on the sensing means, the bottom of the input stem would again contact the limiting check valve and force it off its seat, allowing air to pass from control valve to brake cylinder once more until the value of the brake cylinder called for by the height sensing means was re-established.

BRIEF DESCRIPTION OF THE DRAWINGS

Various other objects, features and advantages of the present invention will become more apparent by reading the following detailed description in conjunction with the drawings, which are shown by way of example only, wherein:

FIGS. 4A and 4B, are a schematic representation of the effects of loading on a railway vehicle on the isolator of the present invention.

DETAILED DESCRIPTION OF THE PREFERRED EMBODIMENTS

Figure 1:
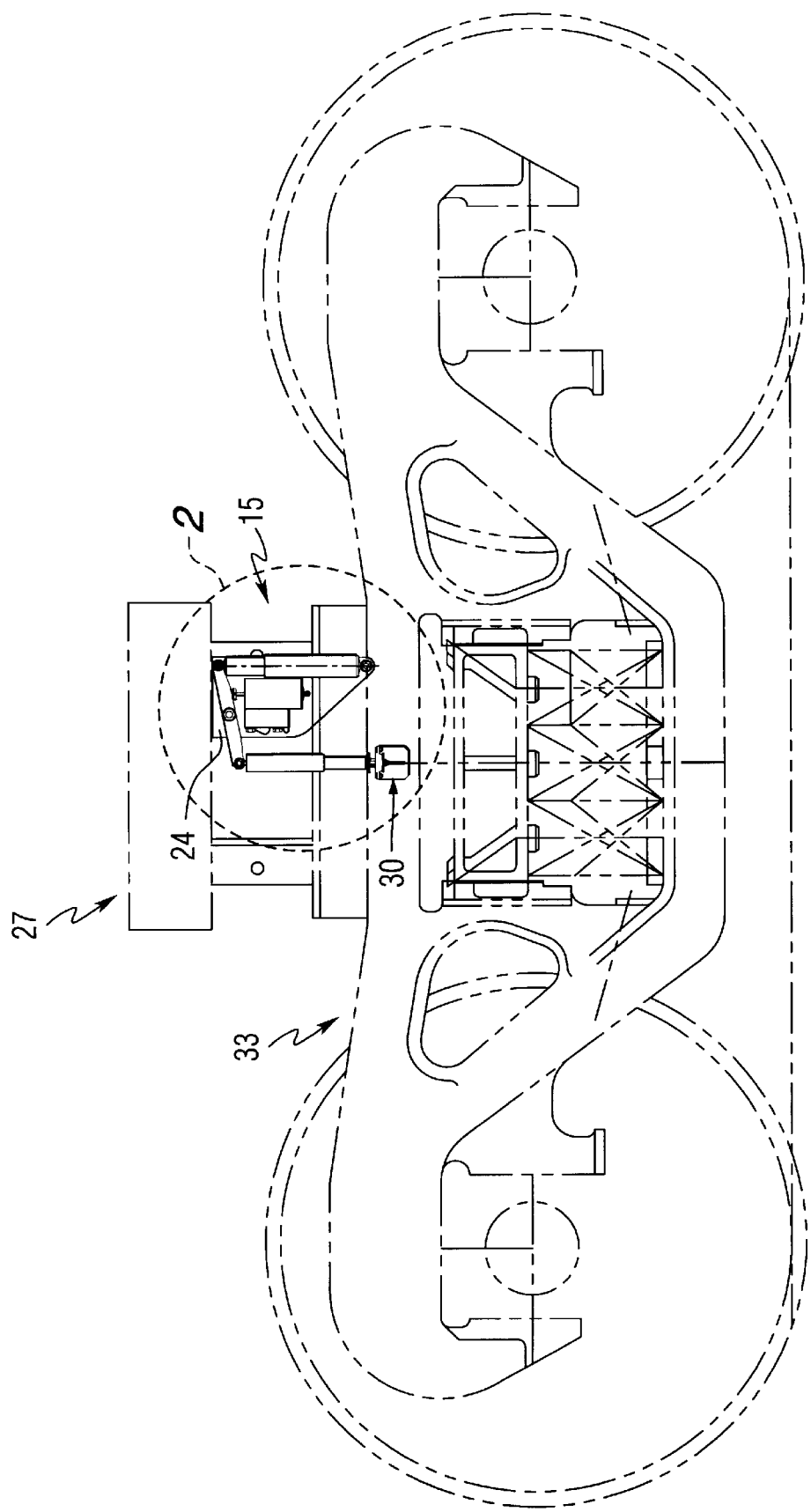
FIG. 1 is a schematic representation of a load proportional brake cylinder pressure limiting system according to the present invention.

Referring now to the drawings in detail, FIG. 1 shows a load proportional brake cylinder pressure limiting system 15 of the present invention. The system is comprised of two basic components: a variable load limiting valve 18 and an isolation means 21. An upper bracket 24 mounts all working parts of the system to a railway vehicle 27, and a small lower bracket 30 operationally connects the system 15 to the vehicle's wheel or truck assembly 33. The upper bracket 27 can be welded to a portion of the car body, while the lower bracket can be welded to the wheel truck side frame compression member. When an equipped wheel truck assembly is to be removed from beneath the railway or freight vehicle car, it is only necessary to disconnect the linkage of the isolation means 21 from the lower bracket 30 to accomplish this. Alternatively, if a truck mounted system is desired, the large bracket 24 may be attached to the truck bolster, and the lower bracket to the side frame, for example, at the edge of the spring basket.

Figure 2:
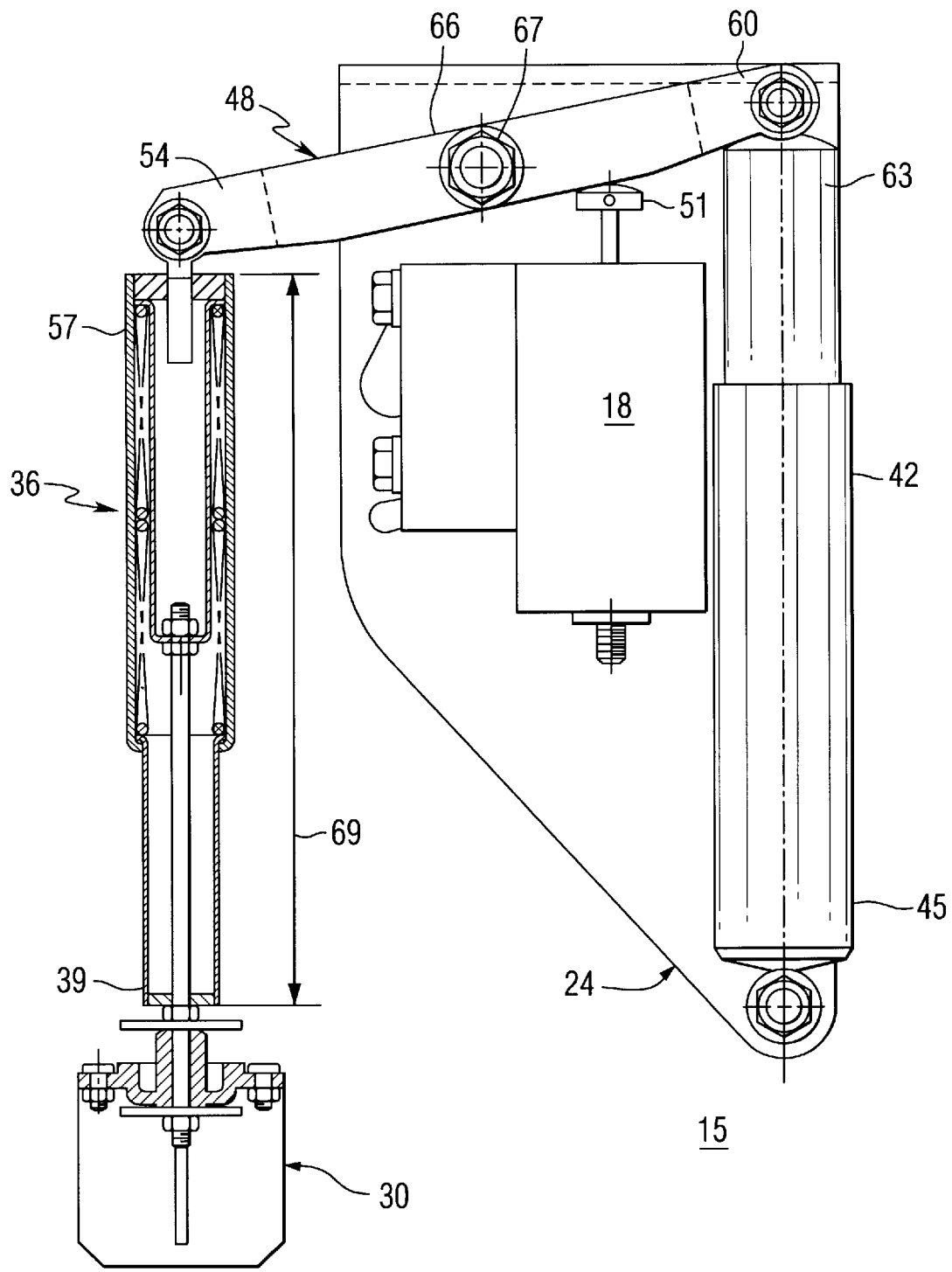
FIG. 2 is a detailed view of the load proportional limiting valve arrangement shown in FIG. 1.

The load proportional brake cylinder pressure limiting system 15 of the present invention is shown in greater detail in FIG. 2. The system basically comprises a variable load limiting valve 18 which is mounted to the upper bracket 24 and an isolation means further comprised of spring-loaded isolator 36 which is secured at a first portion 39 to the lower bracket 30 and an hydraulic damper 42 secured by a first section 45 to the upper bracket 24. The isolator 36 is connected to the hydraulic damper 42 by means of an input lever 48. As will be described more fully hereinafter, the input lever 48 is operatively associated with the variable load limiting valve 18 by its input means 51. A first end 54 of the input lever is rotatably mounted to a second portion 57 of the isolator 36 and a second end 60 is rotatably mounted to a second section 63 of the hydraulic damper. The input lever 48 is pivotally mounted at an intermediate section 66 to the upper bracket 24, such as with a bolt 67. The connection between the input lever and the truck frame bracket as shown in FIG. 2 is therefore not a solid link but a spring loaded telescoping assembly designed to either collapse or extend when a preset load of about 10 pounds is exceeded. As will be described more fully hereinafter, this load is called the caged load, and the height of the isolator when not under excessive load is constant and called the caged height 69. While the second or upper portion 57 of the isolator 36 is connected to one end 54 of the input lever 48, the opposite end 60 of the input lever is connected to the second or upper section 63 of the hydraulic damper 42. The damper has a very slow rate of travel matched to the 10 pound limiting force of the isolator. This arrangement of the three parts acts to isolate the rotation of the input lever 48 from short term dynamic effects as the railway vehicle traverses the railway line of road in a train. Hence the three parts acting together comprise the isolation means 15, the operation of which can be more readily understood in reference to FIG. 3.

Figure 3A:
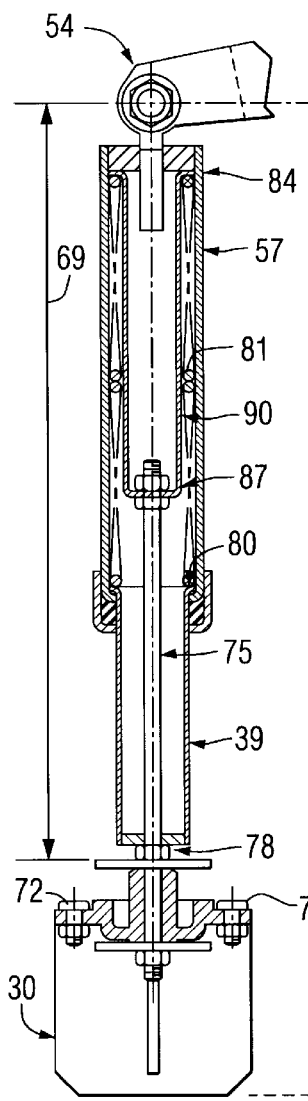
FIGS. 3A, 3B and 3C, are a representation showing the effects of short term change in railway vehicle body height caused by normal vehicle motions on the present invention.
Figure 3B:
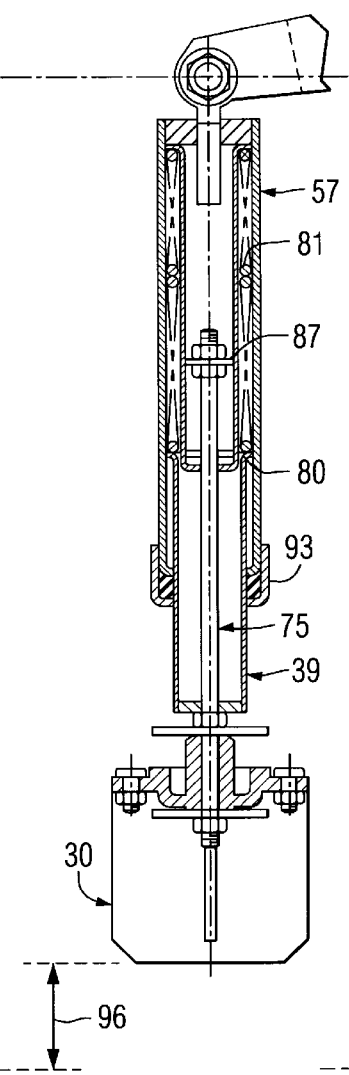

Referring to FIG. 3, the isolator 36 is shown in section with its upper portion or body 57 attached to the one end 54 of the input lever 48 and its lower portion or compression tube 39 connected to the lower bracket 30 by bolts 72, the bracket being securely attached, such as by welding, to the wheel truck assembly. The different views of the figure illustrate the operation and behavior of the isolation means 21 when a vertical track irregularity is encountered which, for example, would cause the wheel truck assembly to deflect relative to the railway vehicle. FIG. 3A is a representation of the isolator 36 at normal height. During operation over an irregularity, the input lever 48 is essentially prevented from moving by the hydraulic damper 42 of the isolation means, thus preventing an erroneous load sensing input to the variable load limiting valve 18. As shown in FIG. 3A, the isolator is shown in its normal position under a light or empty railway vehicle. When the car encounters a track irregularity and the wheel truck 33 bounces upward (FIG. 3B), the lower bracket 30 moves upward almost simultaneously with the wheel truck assembly causing the pull rod 75 attached to the lower bracket to move up with it, and further causing the stop nut 78 on the lower end of this rod to force the compression tube 39 upward, telescoping it into the isolator body 57. The compression tube guide 80 at the top of the compression tube 39 thus compresses the isolation spring 81 against the extension tube guide 84 to stop upward movement by the top of the isolator body.

The pull rod upper guide 87 moves upward away from the bottom of the extension tube 90 as shown in FIG. 3B. Over the relatively short period of time that such a bump or oscillation lasts, the force to deflect the isolation spring 81 causes the damper 42 to move only slightly, as further explained below.

Figure 3C:
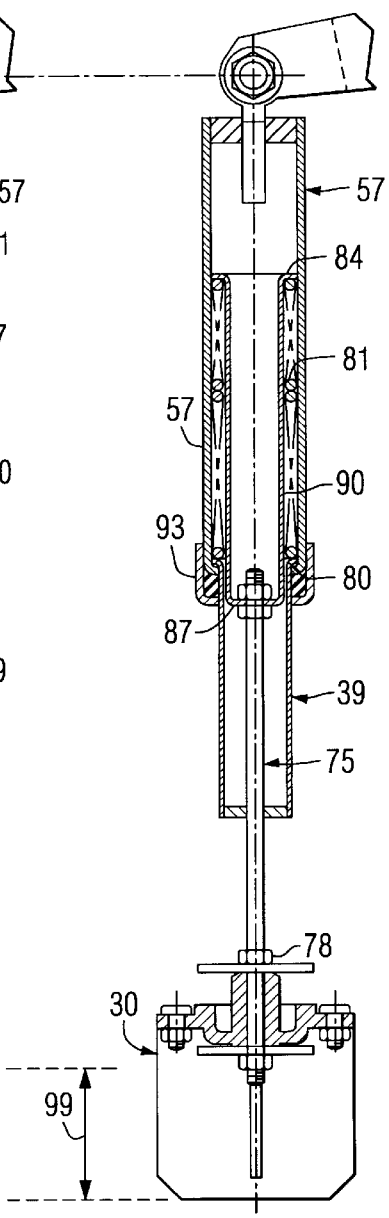

FIG. 3C shows the position of the isolator 36 when the wheel truck rebounds or an axle "drops into a hole". In this position, the forced extension of the isolator pulls down on the pull rod 75 causing its upper guide 87 to pull down on the extension tube 90, compressing the isolation spring 81 between the downward moving extension tube guide 84 and the compression tube guide 80, which is fixed because it is in contact with the bottom lip 93 of the isolator body 57. Thus, the isolation spring is compressed in this case as well. Preferably the total bounce stroke 96 of the isolator is 4.0 inches as is the rebound stroke 99, giving a total deflection of 8 inches of excursion of the car body relative to the truck frame, with no significant motion of the input lever 48.

The effects of loading the railway vehicle on the limiting system 15 can be seen by reference to FIG. 4. Since the position of the wheel truck assembly remains fixed with respect to the track, so does the lower bracket 30, as indicated by reference line 100. However, the freight car body, and hence its attached upper bracket 24, deflect an amount 102 representative of vehicle load (depending on the particular mounting arrangement between the car body 27 and the wheel truck assembly 33). When the car is being loaded, a process which usually takes some amount of time, the isolator 36 initially becomes compressed (similar to the bounce in FIG. 3B) and remains compressed allowing sufficient time for the hydraulic damper 42 to move up as shown in FIG. 4, under the urging of the isolation spring 81. The isolation spring is initially compressed until this motion is stopped by the spring returning to its caged height 69 (FIG. 4A). This returns the isolator 36 to its initial length, but with the damper now shortened by the damper deflection 105 (FIG. 4B). The input lever 48, contacting knob 108 on sensing means 51, correspondingly forces downward the stem 111 of the variable load limiting valve 18, reflecting the new load on the freight car. The damper deflection 105 is proportional to the load on the freight car, which changes the freight car body height 102 relative to the wheel truck assembly, as is the position 114 of the input means 51 with respect to the variable load limiting valve.

The effect of bounce and rebound on the isolation means with the mechanism at the new height are, for the same track perturbation, identical to those at the light car position and in fact would be the same for any load setting, as long term load change affects only the damper length of the isolation means while short term dynamic change affects only the isolator length of the isolation means.

In designing the damper, the limiting force or caged load of the isolation spring 81 is chosen with respect to the damper 42 such that when a load of this value is placed on the damper, it will collapse at a rate not exceeding 2 inches per minute. Thus, during a half cycle of car motion, the damper will only move by a distance of $S=(t/60)\times 2$; where $t$ equals time (seconds) for half a cycle or one-half $f$; and $f$ is equal to the railway vehicle car body frequency (Hz). Most large magnitude suspension vibrations are at about 1 or 2 Hz, 1 Hz being the worst case. This motion would be represented by $S=\frac{1}{60}\times 2=\frac{1}{30}=0.033$ inches. If it is assumed that 1.5 inches in suspension travel will be needed to go from a light car (FIG. 4A) to a fully loaded railway vehicle (FIG. 4B), this would introduce a maximum error of 0.033 in. divided by 1.5 in., which is equal to 2.2% in input lever 48 position. Expressed in another way, if the device were being used to produce a constant 20% braking ratio on a car, this error would raise the braking ratio from 20 percent to $20\times 1.022$ which equals 20.44%. This represents negligible error in the braking system. At the same time, the 2 inch per minute damper rate would assure that within 45 seconds of a load change the compensation would be complete. Since even flood loading of a 50 foot long coal car at 3 feet per second, for example, requires 17 seconds, the effect of a 45 second change of a time on a train would also be negligible.

Figure 5:
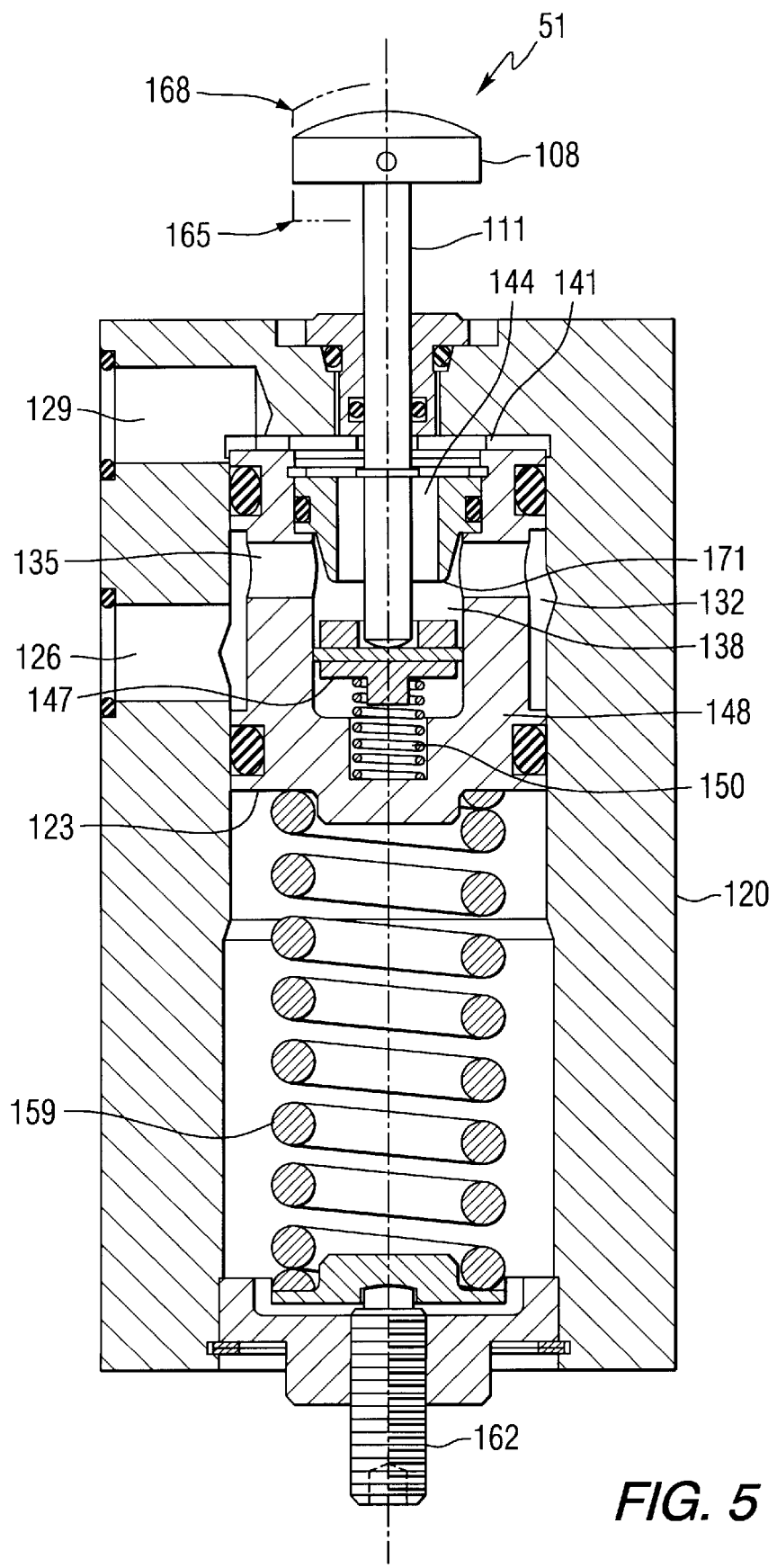
FIG. 5 is a view of a vehicle load limiting valve of the present invention showing a part loaded car having the brakes released.
Figure 6:
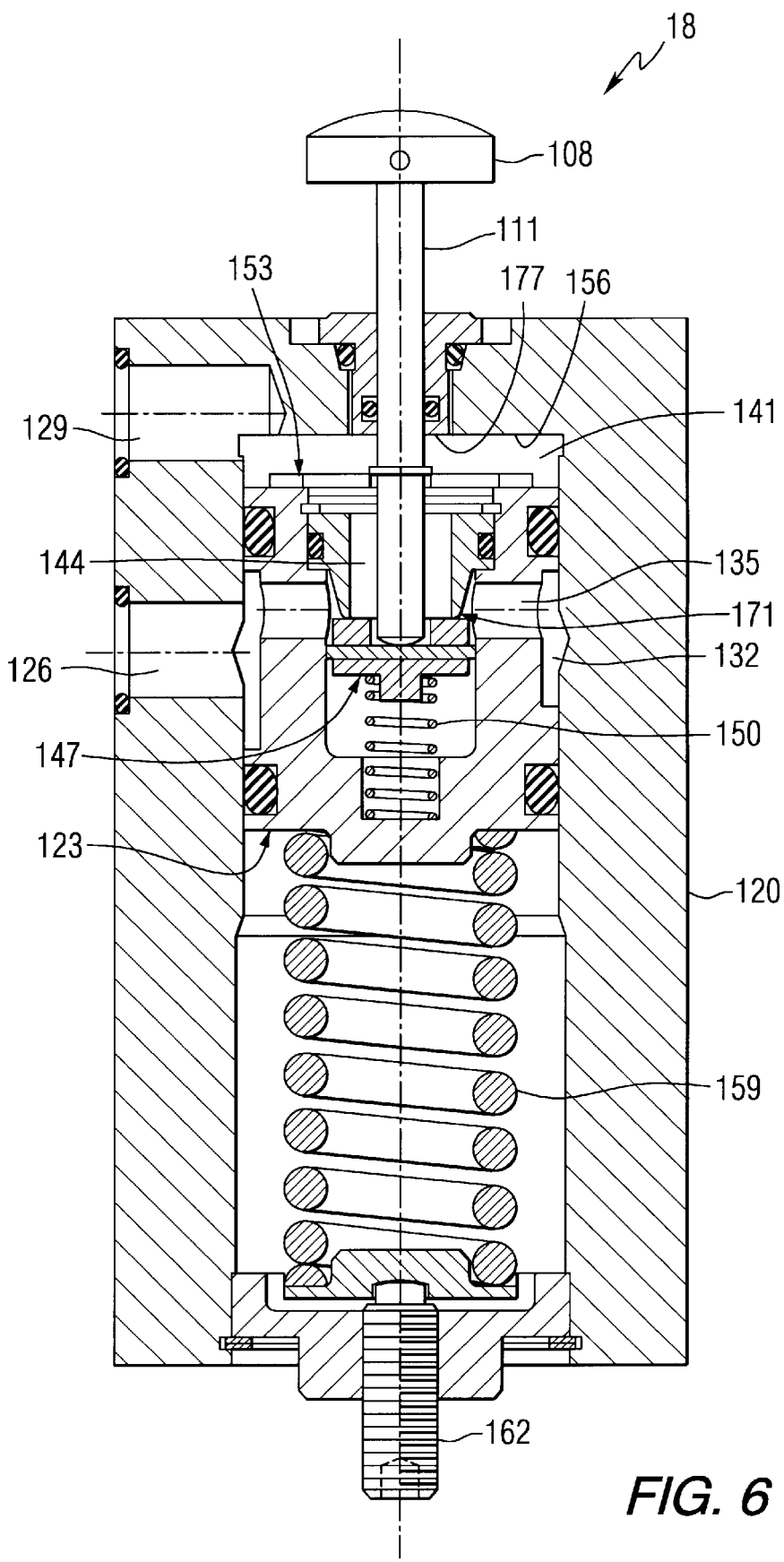
FIG. 6 is a view of a part loaded car shown in FIG. 5 having the brakes applied.
Figure 7:
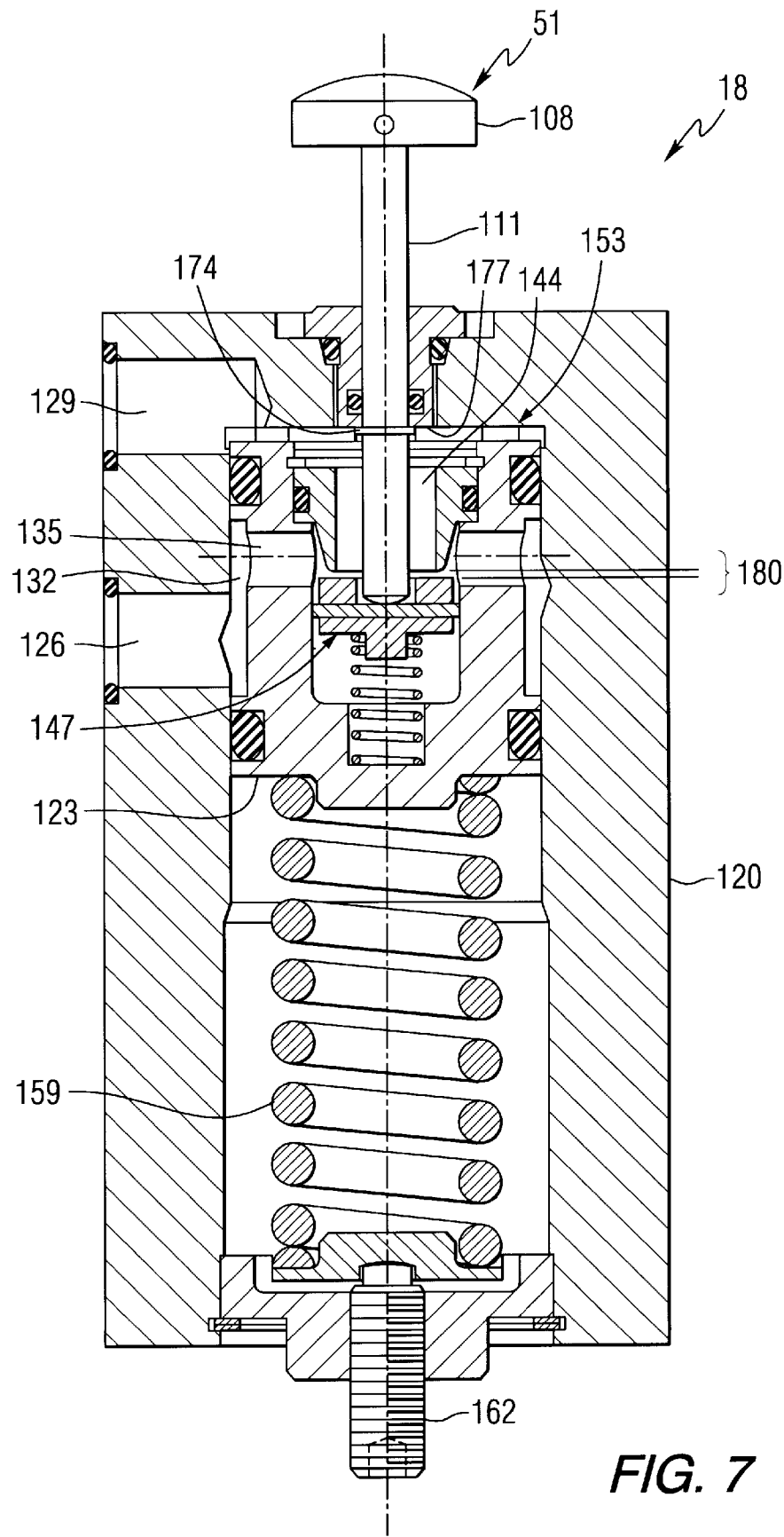
FIG. 7 is a view of a light loaded or empty railway freight car having the brakes released.

Referring now in detail to FIGS. 5–7, the variable load limiting valve 18 operation of the present invention will be described in detail. The limiting valve is comprised of a valve body 120 and the input means 51, the knob 108 of which is contacted by an intermediate part 66 of the input lever 48 between the pivot point 67 and the opposite end 60 of the input lever which is rotatably attached to the second section 63 of the hydraulic damper 42. The variable load limiting valve also comprises a sensing piston 123 housed within the valve body 120 and connected to the input stem 111 at an opposite end of the input means from the knob 108 and input lever. A control valve port 126 connected to a source of fluid, such as pressurized air, is in fluid communication with outlet port 129 via the sensing piston 123, the outlet port 129 being in fluid communication with a brake cylinder which is operatively connected to the air brake for the railway vehicle. Fluid communication is provided between the inlet and outlet ports by an annular passage 132 around the sensing piston, a sensing piston inlet 135 and first chamber 138, which is in fluid communication with second or upper chamber 141 by annular input stem passage 144. Second chamber 141 communicates with outlet port 129. A limiting check valve 147 is mounted to the lower portion 148 of the sensing piston 123 by a spring 150 which urges the check valve against the bottom of the input stem 111. The second or pressure chamber 141 exists between a top portion 153 of the sensing piston 123 and the top portion 156 of the valve body 120 and is in fluid communication with the brake cylinder outlet port 129. The sensing piston 123 is mounted within the valve body 120 by means of a sensing spring 159 and adjusting screw 162.

Brake Application

FIG. 5 shows the variable load limiting valve with its input means 51 positioned between the railway vehicle full 165 and empty 168 positions. Air from the control valve's brake cylinder port (not shown) flows to the control valve inlet port 126 of the variable load limiting valve 18 thence through the annular passage 132 around the sensing piston 123 and sensing piston inlet 135 into the first chamber 138 above the limiting check valve 147 within the sensing piston. Since the limiting check valve is initially held off its seat 171 by the input stem 111, air continues to flow past the check valve and up through the sensing piston via the input stem passage 144 to the pressure chamber 141 above the sensing piston 123, where it acts on the top portion or upper face 153 of this piston urging it downward against the force of the sensing spring 159. As mentioned above, the second or pressure chamber 141 is in constant communication with the brake cylinder outlet port 129.

When the pressure in the second chamber 141 builds up to a point where the sensing piston 123 is caused to move (downward in the figure), this movement will be greater for greater pressure until the face of the check valve seat 171, which is carried with the piston, will contact the face of the check valve 147 and move the seat slightly downward towards the end of the input stem 111, as shown in FIG. 6. When this point is reached the check valve 147 is seated, cutting off air flow to the input stem passage 144 and preventing further buildup of air pressure in the brake cylinder, since fluid communication with the pressure chamber 141 has now been interrupted. The control valve service piston in this condition will remain in service, rather than "service lap" position so any leakage of brake cylinder pressure will be made up from the reservoir. Likewise, should car weight increase during a brake application, as might be the case in flood loading a train of cars under a coal tipple for example, brake cylinder pressure will rise (after sufficient time to allow the new car height to affect the input lever 48) to the new value called for by the limiting valve, since the check valve 147 will have correspondingly moved downward with corresponding downward movement of the input stem 111, thereby re-establishing communication between the inlet port 126 and the first chamber 138.

It should be noted that this cutoff point is fixed solely by the position of the input means as determined by the input lever, while the pressure at cutoff is determined by the stiffness and initial adjustment of the sensing spring 159.

Brake Release

When the brakes are released, pressure in the control valve port 126 is reduced to atmosphere, and the flow of air is from the brake cylinder port 129 into the pressure chamber 141, thence downwards through the input stem passage 144 of the sensing piston 123 forcing the limiting check valve 147 downward off its seat 171 against the force of the check valve spring 150, regardless of the position of the input means 51. Thus the valve cannot cause sticking brakes. Further, as brake cylinder pressure falls off, the sensing piston 123 and the check valve seat 171 will move upward, forcing the check valve to remain off its seat because of the action of the input stem 111 against the check valve 147, assuring a full and complete release of the brakes.

Assured Minimum Brake

With the proposed system there is the possibility that the isolator or other part of the linkage could be broken or damaged resulting in the input lever being disconnected from its normal input, or even forced to a position limiting brake cylinder pressure to a value even lower than that desired for the light car. Additionally, it is not desirable to provide maximum brake cylinder pressures of less than about 20 PSA because at such low pressures, friction and release spring effects significantly decrease actual delivered brake shoe force below that which would be obtained in the absence of these effects. For both of these reasons, the variable load limiting valve is fitted with an internal stop 174 designed to prevent the limiting of brake cylinder pressure to values so low that, because of friction and release spring effects, the brakes are rendered ineffective. The position of the limiting valve in this light car or low load condition is shown in FIG. 7. Referring in detail to this figure, the input stem 111 is prevented from moving completely upward by its internal upstop 174 contacting the stem gland 177. In this position, the dimensioning of the sensing piston 123 and input stem length are such that the check valve 147 is held off its seat 171 by a minimum lift 180. When the brakes are applied in this condition, the brake cylinder pressure will build up as before until the sensing piston 123 begins to move downward. The pressure at which this occurs is adjustable by the sensing spring adjusting screw 162, while the pressure rise as a function of car height above this point is determined by the rate of the sensing spring 159, thus permitting tailoring the range of brake cylinder response to the spring travel, tare weight and gross weight, and service requirements of the car.

While specific embodiments of the invention have been described in detail, it will be appreciated by those skilled in the art that various modification and alterations would be developed in light of the overall teachings of the disclosure. Accordingly, the particular arrangements disclosed are meant to be illustrative only and not limiting as to the scope of the invention which is to given the full breadth of the appended claims and any and all equivalents thereof.

What is claimed is:

1. A system for adjusting vehicle brake cylinder pressure according to the vehicle load condition comprising:
    a limiting valve having means for continuously varying the pressure of fluid supplied to a fluid operable braking apparatus on a vehicle in accordance with the load carried by said vehicle, said limiting valve having means for sensing a load bearing on a vehicle wheel assembly;
    means for isolating said load force sensing means from transient deflections of the vehicle not cause by vehicle load, wherein said isolating means further comprises:
    an upper bracket secured to a vehicle body;
    a lower bracket secured to the vehicle wheel assembly;
    a damper having a first section secured to the upper bracket and a second section movably mounted to the first section;
    an isolator having a first portion secured to the lower bracket and a second portion slidably mounted to the first portion; and
    an input lever having a first end rotatably mounted to the second portion of the isolator and a second end rotatable mounted to the second section of the damper, said input lever being pivotally mounted at an intermediate section between said first and second end to the upper bracket, said input lever being operatively associated said load force sensing means of the limiting valve.

2. The vehicle brake cylinder pressure system as recited in claim 1, wherein said limiting valve means comprises:

a valve body having an inlet port connected to the control valve device and an outlet port connected to the brake cylinder device;

a sensing piston slidably disposed within the valve body and defining a pressure chamber between the sensing piston and the valve body adjacent the outlet port and providing a fluid communication path between the inlet port and the outlet port, said load sensing means being slidably connected to said sensing piston for providing an indication according to the vehicle load, said load sensing means operable between an empty position and a fully loaded position;

a limiting check valve in contact with one end of said load sensing means and generally movable therewith; and a valve seat operatively connected to said sensing piston and movable therewith, the valve seat movable between an open position wherein a first chamber is provided between the valve seat and the limiting check valve and a closed position wherein the valve seat contacts the limiting check valve to close the fluid communication path under pressure to the brake cylinder device.

3. The vehicle brake cylinder pressure system as recited in claim 2, said load sensing means comprising an input stem slidably connected with the valve body, and the sensing piston further comprises a lower portion and a top portion defining the first chamber therebetween, the limiting check valve being resiliently connected to the lower portion, the first chamber being in fluid communication with the inlet port.

4. The vehicle brake cylinder pressure system as recited in claim 3, further comprising a limiting check valve seat connected to the top portion of the sensing piston and including an annular passage between said load sensing means and the limiting check valve seat, the first chamber being in fluid communication with the pressure chamber via the annular passage.

5. The vehicle brake cylinder pressure system as recited in claim 4, further comprising a cutoff spring connected between the lower portion of the sensing piston and the valve body.

6. The vehicle brake cylinder pressure system as recited in claim 4, wherein the limiting check valve is connected to the lower portion of the sensing piston by a spring urging the limiting check valve against said load sensing means whereby the sensing piston is movable with respect to the limiting check valve such that the limiting check valve seat can contact the limiting check valve to close the fluid communication path.

7. The vehicle brake cylinder pressure system as recited in claim 1, wherein said limiting valve means comprises:

a valve body having an inlet port connected to the control valve device and an outlet port connected to the brake cylinder device;

a sensing piston slidably disposed within the valve body and defining a pressure chamber between the sensing piston and the valve body adjacent the outlet port and providing a fluid communication path between the inlet port and the outlet port, said load sensing means being slidably connected to said sensing piston for providing an indication according to the vehicle load, said load sensing means operable between an empty position and a fully loaded position;

a limiting check valve in contact with one end of said load sensing means and generally movable therewith; and a valve seat operatively connected to said sensing piston and movable therewith, the valve seat movable between an open position wherein a first chamber is provided between the valve seat and the limiting check valve and a closed position wherein the valve seat contacts the limiting check valve to close the fluid communication path under pressure to the brake cylinder device.

8. The vehicle brake cylinder pressure system of claim 7, wherein the first portion of the isolator is slidably mounted to the second portion by a spring.

9. The vehicle brake cylinder pressure system of claim 8, wherein the spring has a limiting force substantially equivalent to the damper rate such that the input lever does not provide an input to the variable load limiting valve upon deflection of the wheel assembly with respect to the vehicle body.

10. The vehicle brake cylinder pressure system of claim 1, wherein the first portion of the isolator is slidably mounted to the second portion by a spring having a limiting force substantially equivalent to the damper rate such that the input lever does not provide an input to the variable load limiting valve upon deflection of the wheel assembly with respect to the vehicle body.

11. A variable load limiting valve for use in a vehicle brake control system, the variable load limiting valve being operably disposed between a vehicle control valve and brake cylinder device for adjusting brake cylinder pressure during a brake application according to the vehicle load, the variable load limiting valve comprising:

a valve body having an inlet port connected to the control valve device and an outlet port connected to the brake cylinder device;

a sensing piston slidably disposed within the valve body and defining a pressure chamber between the sensing piston and the valve body adjacent the outlet port and providing a fluid communication path between the inlet port and the outlet port;

load sensing means slidably connected to said sensing piston for providing an indication according to the vehicle load, said load sensing means being variably operable between an empty position and a fully loaded position;

a limiting check valve in contact with one end of said load sensing means and movable therewith; and a valve seat operatively connected to said sensing piston and movable therewith, the valve seat movable between an open position wherein a first chamber is provided between the valve seat and the limiting check valve and is in fluid communication with the inlet port and the pressure chamber, and a closed position wherein the valve seat contacts the limiting check valve to close the fluid communication path under pressure to the brake cylinder device.

12. The variable load limiting valve as recited in claim 11, said load sensing means comprising an input stem slidably connected with the valve body, the input stem including an internal stop such that a minimum pressure chamber is defined in the empty position.

13. The variable load limiting valve as recited in claim 11, wherein the sensing piston further comprises a lower portion and a top portion defining the first chamber therebetween, the limiting check valve being resiliently connected to the lower portion, the first chamber being in fluid communication with the inlet port.

14. The variable load limiting valve as recited in claim 13, further comprising a limiting check valve seat connected to the top portion of the sensing piston and including an annular passage between said load sensing means and the limiting check valve seat, the first chamber being in fluid communication with the pressure chamber via the annular passage.

15. The variable load limiting valve as recited in claim 14, further comprising a cutoff spring connected between the lower portion of the sensing piston and the valve body.

16. The variable load limiting valve as recited in claim 13, wherein the limiting check valve is connected to the lower portion of the sensing piston by a spring urging the limiting check valve against said load sensing means whereby the sensing piston is movable with respect to the limiting check valve such that the limiting check valve seat can contact the limiting check valve to close the fluid communication path.

17. The variable load limiting valve as recited in claim 13, the sensing piston further comprising an inlet wherein the fluid communication path is defined by the inlet port, the sensing piston inlet, the first chamber, the annular passage, the pressure chamber and the outlet port.

18. The variable load limiting valve as recited in claim 11, said load sensing means comprising an input stem slidably connected with the valve body, and the sensing piston further comprises a lower portion and a top portion defining the first chamber therebetween, the limiting check valve being resiliently connected to the lower portion, the first chamber being in fluid communication with the inlet port.

19. The variable load limiting valve as recited in claim 18, further comprising a limiting check valve seat connected to the top portion of the sensing piston and including an annular passage between said load sensing means and the limiting check valve seat, the first chamber being in fluid communication with the pressure chamber via the annular passage.

20. In a railway vehicle having a vehicle body, a wheel assembly and a braking system having a variable load limiting valve, means for isolating the variable load limiting valve from transient deflection of the wheel assembly with respect to the valve body, said isolating means comprising:

an upper bracket secured to a vehicle body;

a lower bracket secured to the vehicle wheel assembly;

a damper having a first section secured to the upper bracket and a second section movably mounted to the first section;

an isolator having a first portion secured to the lower bracket and a second portion slidably mounted to the first portion; and an input lever having a first end rotatably mounted to the second portion of the isolator and a second end rotatably mounted to the second section of the damper, said input lever being pivotally mounted at an intermediate section between said first and second end to the upper bracket, said input lever being operatively associated said variable load limiting valve.

21. The vehicle brake cylinder pressure system of claim 20, wherein the first portion of the isolator is slidably mounted to the second portion by a spring.

22. The vehicle brake cylinder pressure system of claim 21, wherein the spring has a limiting force substantially equivalent to the damper rate such that the input lever does not provide an input to the variable load limiting valve upon deflection of the wheel assembly with respect to the vehicle body.

* * * * *